United States Patent [19]
Faig et al.

[11] Patent Number: 5,362,222
[45] Date of Patent: Nov. 8, 1994

[54] INJECTION MOLDING MACHINE HAVING A VECTOR CONTROLLED AC DRIVE SYSTEM

[75] Inventors: Harold J. Faig, Cincinnati; Ronald M. Sparer, Madeira, both of Ohio

[73] Assignee: Cincinnati Milacron Inc., Cincinnati, Ohio

[21] Appl. No.: 113,627

[22] Filed: Aug. 31, 1993

[51] Int. Cl.$^5$ ............................................. B29C 45/80
[52] U.S. Cl. .................................. 425/145; 264/40.3; 264/40.5; 264/40.7; 318/138; 318/254; 425/149; 425/150; 425/589
[58] Field of Search ............... 425/135, 145, 149, 150, 425/169, 170, 171, 589, 592, 593, 451.5, 451.6; 264/40.3, 40.5, 40.7; 318/772, 798, 799, 800, 778, 805, 808

[56] References Cited

U.S. PATENT DOCUMENTS

| | | | |
|---|---|---|---|
| 4,259,628 | 3/1981 | Iwakane et al. | 318/799 |
| 4,484,128 | 11/1984 | Jotten et al. | 318/805 |
| 4,751,447 | 6/1988 | Okachi | 318/772 |
| 4,764,712 | 8/1988 | Blaschke et al. | 318/778 |
| 4,800,327 | 1/1989 | Fujioka et al. | 318/798 |
| 4,808,903 | 2/1989 | Matsui et al. | 318/800 |
| 4,823,066 | 4/1989 | Yoshiki et al. | 318/798 |
| 4,862,054 | 8/1989 | Schauder | 318/800 |
| 4,916,376 | 4/1990 | Kume et al. | 318/808 |
| 4,988,273 | 1/1991 | Faig et al. | 425/145 |

OTHER PUBLICATIONS

P. Walter and F. Klein, : "Vector Control Gives AC Drive the Edge Over DC", PCIM magazine, Jun. 1989.
B. Bose, *Adjustable Speed AC Drive Systems*, "Introduction to AC Drives" (pp. 1–21) 1981.
"AC Drives Encroach on DC's Domain", Electrical Review, vol. 22, No. 17, Sep., 1988.
H. Murphy, "Getting the Most From Expanding Motor Technology: A Comparison of AC and Brushless DC", May 1985.
A. Rosenberger, "Vector Control—the Future for Drives", Electrical Review vol. 221, No. 22, Nov. 1988.
J. Vithayathil, "Field Oriented Control (Vector Control) of 3 Phase Squirrel Cage Induction Motors", 1991.
F. Blaschke, "The Principle of Field Orientation as Applied to the New Transvektor Closed-Loop Control System for Rotating Field Machines" May 1972.
"Understanding Vector Control", Baldor—distributed during seminar at Electronics and Instrument Conference, Mar. 1993.
C. Wasko, "AC Vector Control Drives for Process Applications", Oct. 1985.
C. Wilson and R. Handon, "Practical Techniques for Implementing Vector Control" Motion Control magazine, Apr. 1991.
F. Klein, "AC Vector Drive Using Current Regulated PWM", distributed at Electronics and Instrument Conf., Mar. 1993.

*Primary Examiner*—Tim Heitbrink
*Attorney, Agent, or Firm*—Stephen H. Friskney

[57] ABSTRACT

An injection molding machine utilizing vector controlled AC induction motors in its servomechanism drive systems. Vector controlled AC induction motors provide a cost effective high power drive system which superior performance capabilities. Further system efficiencies are realized when the control is configured to run multiple motors by multiplexing the computer controller circuits for the power sections of each motor.

12 Claims, 8 Drawing Sheets

INJECTION MOLDING MACHINE HAVING A VECTOR CONTROLLED AC DRIVE SYSTEM

FIELD OF INVENTION

The present invention relates to electric motor drives for injection molding machines and more particularly to the use of vector controlled AC induction motors in servomechanism drive systems for injection molding machines.

DESCRIPTION OF THE RELATED ART

Injection molding machines have traditionally been designed to use hydraulic systems as their primary source of motive power. Hydraulic devices have proven to be satisfactory over the years. They are relatively inexpensive, have power and velocity response characteristics compatible with the requirements of an injection molding machine, and are rugged and reliable.

However, hydraulic systems do have several inherent disadvantages. The hydraulic oil is subject to dirt and contamination in an industrial environment and requires filtering and maintenance. Further, there is the potential for oil leakage which makes them unsuitable for "clean room" manufacturing environments. The hydraulic drive has limited positioning accuracy and repeatability and changes in temperature of the hydraulic oil will lead to further variations in performance. Finally, the hydraulic drive is not energy efficient, and therefore, it requires heat exchangers and coolers to remove heat from the oil and maintain a constant oil temperature.

Electric motor servomechanism drives provide an alternative to hydraulics and have been available for over forty years. The earlier systems utilized the well-known brush-type DC motor which has a number of coils wound on an armature terminating at a commutator. The armature is surrounded by a stator having a number of permanent or coil magnets corresponding to the number of windings on the armature. As the motor rotates, carbon brushes sequentially connect the armature coils to a power supply. The successive current flows through the coils create a magnetic field which reacts with the stator magnetic field to cause a torque on the armature, thereby continuing the rotational motion of the armature and the energization/commutation of the armature coils.

The most desirable characteristic of the brush-type DC motor is the simplicity of its control which is the result of several inherent motor characteristics. First, for any applied armature voltage, the maximum limits of speed and torque are established; and for a given operating condition, speed and torque will have an inverse relationship, i.e. as the motor load increases, the speed will decrease. Second, torque is easily controlled because of its direct linear relationship with armature current. Finally, for maximum torque, the magnetic field created by the armature current flow must be in space quadrature with the poles of the stator magnetic field. The commutator construction of the armature automatically switches each armature coil at the right armature position to maintain the optimum space quadrature relationship. In spite of their simplicity and desirable performance characteristics, servomechanism drives utilizing the brush-type DC motors have the disadvantages of brush sparking, brush wear, brush maintenance and low speed torque ripple. In addition, having current conducting windings on the armature not only increases armature inertia, but it is difficult to dissipate heat from the armature which is separated from the stator and motor casing by an air gap.

Over the last twenty years, newer servomotor designs have been successful in approximating the inverse linear speed-torque characteristics of a DC motor without having to utilize the troublesome brushes. These newer designs represent several different motor technologies but they are often collectively referred to as brushless motors. Since they generally replicate brush-type DC motor performance, they are also sometimes over broadly referred to collectively as brushless DC motors. However, upon closer examination, the brushless servomotor technology is more accurately separated into AC induction motors, AC synchronous motors, and brushless DC motors. Each of those motors has a unique physical construction, a unique control theory, and unique operating characteristics.

The application of AC induction motors in high performance servomechanism drives is the most recent development. The motor utilizes a short circuited squirrel-cage rotor and three phase windings on the stator. Although variable speed control of such a motor in a servomechanism drive is very complex and rather costly, it is becoming more practical through vector (field oriented) control and will subsequently be discussed in great detail.

Another category of brushless servomotors is the AC synchronous servomotor. This inside-out 3-phase motor design has a field generated by a permanent magnet rotor utilizing rare-earth magnetic materials to maximize magnetic flux density and minimize weight. Therefore, the inertia of the rotor is reduced which optimizes the dynamic response of the motor. The stator has a number of sets of windings in each of its three phases, generally four, six, or eight, equal to the number of magnets in the rotor. Current flow in the three phase stator windings combine to produce a resultant magnetic field vector which interacts with the magnetic field of the rotor magnets to produce a torque. The magnitude of the magnetic vector and its angle relative to the magnetic moment of the rotor determines the magnitude and sense of the torque.

The geometry of the stator windings and the distribution of flux density of the permanent magnet rotor is such that a sinusoidal electro-motive force (EMF) 11 as shown in FIG. 1a is induced in the windings when the rotor is turned at a constant speed. The amplitude and frequency of the induced EMF are proportional with the speed. If the stator windings are supplied with 3-phase sinusoidal currents 15 of equal amplitude and frequency but shifted in phase by 120 degrees as shown in FIG. 1a, a rotating magnetic field will result at the stator poles. The strength of that magnetic field is proportional with the amplitude of the currents in the stator windings.

In order to achieve a maximum torque at a given current and an approximately direct linear torque-current, the relationship of the phase angle of each stator current and the angle of the magnetic vector produced by the rotor magnets must be held constant. Therefore, the phase relationship of the sinusoidal currents applied to the stator windings must be controlled and maintained in synchronous phase with the respective induced EMF's.

To accomplish the above functions, a feedback loop is closed between the motor and the motor control in order to obtain information regarding the motor operation. First, a feedback signal is required to determine the direction of shaft rotation. Second, a feedback signal is required which defines the instantaneous absolute position of the rotor shaft so that the amplitude and phase of the current signals may be properly controlled. Finally, a feedback signal is required to measure motor speed which is necessary for velocity control. In most AC synchronous servomotors, all three feedback signals are derived from an absolute high resolution pulse encoder or a resolver having an incremental resolution that is typically in the range of 2000–4000 pulses per revolution. As will be subsequently discussed in more detail, AC servomotors require a very complex control for adjusting the stator currents and digitally creating the sinusoidal current wave forms for each phase.

Over the last several years, some injection molding machines have been introduced using AC synchronous servomotors. These systems are designed as high performance servomechanism drives and have also gained favor as motive power systems in machine tools, industrial robots and other applications. To obtain superior servo performance, the design of AC synchronous motors has evolved to maximize the motor's response time and positioning resolution and accuracy. For example, exotic magnetic materials are used in the motor rotor to reduce weight and inertia. Further, motor construction is relatively sophisticated, and motor controls have been developed to provide the complex commutation necessary to achieve higher positioning resolution and accuracy. The end result is that high performance is achievable but more complex controls are required with a higher cost. Further, the smaller compact designs of AC synchronous motors which are required for high servo performance have resulted in motors having limited power output. Consequently, in applications where more power is required a plurality of motors must be ganged together into a single motive power system.

The final type of brushless servomotors is the brushless DC motor. In this motor, the stator is comprised of a number of windings in each of three phases equal to the number of magnets on a permanent magnet rotor. The magnets mounted on the rotor are typically common ceramic magnets, although they may also be made from other materials, depending on the application. The geometry of the stator windings and the permanent magnet geometry on the rotor produce a distribution of flux density on the rotor such that a trapezoidal EMF waveform 17 as shown in FIG. 1b is induced in the stator windings when the rotor is turned at a constant speed. The cumulative effect of the trapezoidal EMF in each phase is to produce an approximately flat waveform for the induced current in the stator. Constant torque is produced when rectangular current block signals 19 as shown in FIG. 1b are applied to the stator windings. It should be noted that the blocks of current are discontinuously applied for durations of 120 degrees as opposed to the continuous application of sinusoidal current over 180 degrees in an AC servomotor as show in FIG. 1a. The commutation of this discontinuous current from one winding to another is the primary cause of the cogging characteristic in brushless DC motors.

The amplitude of the EMF is proportional with the speed; therefore, speed is controlled by controlling the voltage amplitude of the signal applied to the stator windings. The amplitude of the current blocks in the stator is linearly proportional to and controls the generated torque. For uniform torque generation, regardless of the rotor position, current commutation has to occur at predetermined rotor angles. These angles are usually detected by three Hall effect sensors which are mounted on the stator and provide feedback information to the motor control to control the switching of the motor stator currents. In addition, an inexpensive low resolution tachometer may be used to provide a rotor velocity signal.

Through the commutation logic, the current-torque and voltage-speed characteristics of the brushless DC motor become substantially similar to those of the brush-type DC motor. Consequently the regulation circuit for a brushless DC motor is quite simple, and it can be configured to emulate the control characteristics of the brush-type DC motor drive.

Brushless DC motors have the inherent disadvantage of motor cogging which is created by torque pulsations or ripples resulting from the commutation of discontinuous current blocks from one motor winding to another. The motor cogging is manifested by torque pulsations or surges during motor operation which is more noticeable at lower speeds and can cause variations in finished part characteristics. Further, brushless motors (DC and AC) will sometimes hunt or oscillate when they are not rotating but still holding torque. This oscillation is primarily caused by the incremental velocity feedback used in a typical motor controller and may result in wear on machine components.

To minimize motor cogging, it has been suggested that pressure or a variable representing a process or machine force may be controlled using the servomotor velocity loop. For example, the cogging of the injection motor causes periodically similar variations in pressure between the extruder screw and the molten material. Those pressure variations about a pressure set point may be used to inversely modify a velocity command signal such that when the pressure increases, the velocity command signal is decreased and vice versa. The result is a more complex control with varying degrees of effectiveness, depending on fluctuation in the process variable and sensor accuracy.

Brushless DC motors have typically been applied to general purpose power systems where velocity is the primary control parameter and torque is relatively constant or very predictable. Such applications include conveyors, elevators, winding machines, etc. where motor cogging is not a problem and high positioning accuracies are not required, accordingly, brushless DC motors have not typically been considered for machines requiring greater positioning accuracies and faster servo response. The general consensus of those designing machinery where motor cogging and servo performance are a consideration has been to ignore the brushless DC motor technology as not suitable and to select the generally accepted AC servomotor. Although the use of brushless DC motors on injection molding machines is feasible, that the problems of motor cogging and zero velocity oscillations increase control complexity and system cost. Positioning accuracy is also a key consideration, and must be equal to or better than state-of-the-art hydraulically-actuated machines.

Finally, in both AC and DC permanent magnet servomotors, the ability to control torque is restricted to the ability to control stator flux and the angle between the stator flux and rotor flux. It is also important to note that the permanent magnet rotor construction imposes certain control limitations. If the stator flux is increased beyond a maximum level in controlling torque, demagnetization of the rotor magnets can occur, effectively disabling the motor. Accordingly, the ability to control torque in these motors is definitely limited.

SUMMARY OF THE INVENTION

Applicants desire to have the benefits of electric motor drives on an injection molding machine, but they wish to avoid the inherent power limitations of available AC synchronous motors, as well as the torque limitations imposed by potential rotor demagnetization in both AC and DC brushless servomotors.

Applicants have determined that AC induction motors have not been used for drive systems in injection molding machines because of general sloppiness in movements which adversely affecting positioning accuracy and repeatability. However, applicants have discovered that by implementing special control algorithms in conjunction with vector control technology, AC induction motors can effectively be used as servomechanism drives on an injection molding machine. Vector drives have several advantages over their DC counterparts. They offer wider speed ranges, faster acceleration rates, have no mechanical commutation system to wear and maintain, exhibit extended constant HP ranges, mechanically interface easily with NEMA dimensioning, and are readily available from manufacturers' stock.

Applicants have further discovered that the vector control for the motor drives can be configured to run multiple motors, potentially four or more in an injection molding machine, one or more at a time. This is accomplished by multiplexing the controller CPU (central processing unit, i.e. computer) for the power sections of each motor. One of the drawbacks to implementing vector control for injection molding machines is that the controller CPU for this type of system is very complex and expensive. By sharing the controller CPU between several motors and power transistors, a significant cost savings is realized without sacrificing machine performance.

An object and advantage of this invention is to provide an injection molding machine having vector controlled AC induction motor drives that are rugged, are of simple construction, are reliable, have superior speed and torque capabilities and can be obtained at a cost comparable to permanent magnet servomotors.

A related object and advantage of the invention is to provide vector controlled AC induction motor drives for a full range of injection molding machine sizes including those capable of 1000 tons or more of clamping force without having to gang together two or more motors in a single drive unit to provide the necessary power.

A further object and advantage of this invention is to provide an injection molding machine having vector controlled AC induction motor drives which provide performance equal to or better than the performance requirements of current state of the art injection molding machines at a reduced cost.

A still further object and advantage of this invention is to provide an injection molding machine having vector controlled AC induction motor drives for the clamp unit, the extruder and injection unit, as well as the other closed loop motive power systems typically used on an injection molding machine, wherein the vector control for the motor drives is configured to run multiple motors.

DESCRIPTION OF THE PREFERRED EMBODIMENT

Applicants have developed an injection molding machine drive system using vector controlled AC induction motors. Although the AC induction motor has been used extensively in industrial applications for many years, it has not been used extensively as a servomotor due to complex and expensive control requirements. Despite the advantages of induction motors compared to DC permanent magnet motors, such as low cost, light weight, reduced inertia, low maintenance and high efficiency, its primary application has remained in constant speed drive applications.

Effective use of induction motors as servomotors in injection molding machines depends on suitable electronic control. As with all motor configurations, the ability to produce maximum torque in an induction motor is dependent on maintaining a 90 degree relationship between the flux of the stator and the flux of the rotor. In permanent magnet servomotors, the ability to control torque is restricted to the ability to control stator flux and the angle between the stator axis and the rotor axis. However, if the stator flux is increased beyond a maximum level, demagnetization of the rotor magnets can occur. In an induction motor, control of stator flux, rotor flux and the angle between them is accomplished by vector control. This control strategy is capable of getting the same dynamic performance from an AC induction motor as is typically achieved in a DC machine. A brief review of DC technology will make vector control technology and strategy easier to understand.

Electric motors produce torque by the interaction of two magnetic fields. One of the fields is from the rotor and the other is from the stator of the motor. These fields are magnetic lines of force or flux in the air gap between the rotor and the stator. When these magnetic fields are in alignment (north pole to south pole) no torque is produced. When one of the fields is rotated, the other field will attempt to follow it to maintain magnetic alignment. If a load is applied on the rotor, its magnetic field will begin to lag the other magnetic field associated with the stator. As the load is increased, the rotor field will fall further behind until the magnetic fields are 90° out of alignment. At this point the fields produce their maximum magnetic interaction which is equal to the pullout torque in an electric motor.

Figure 2:
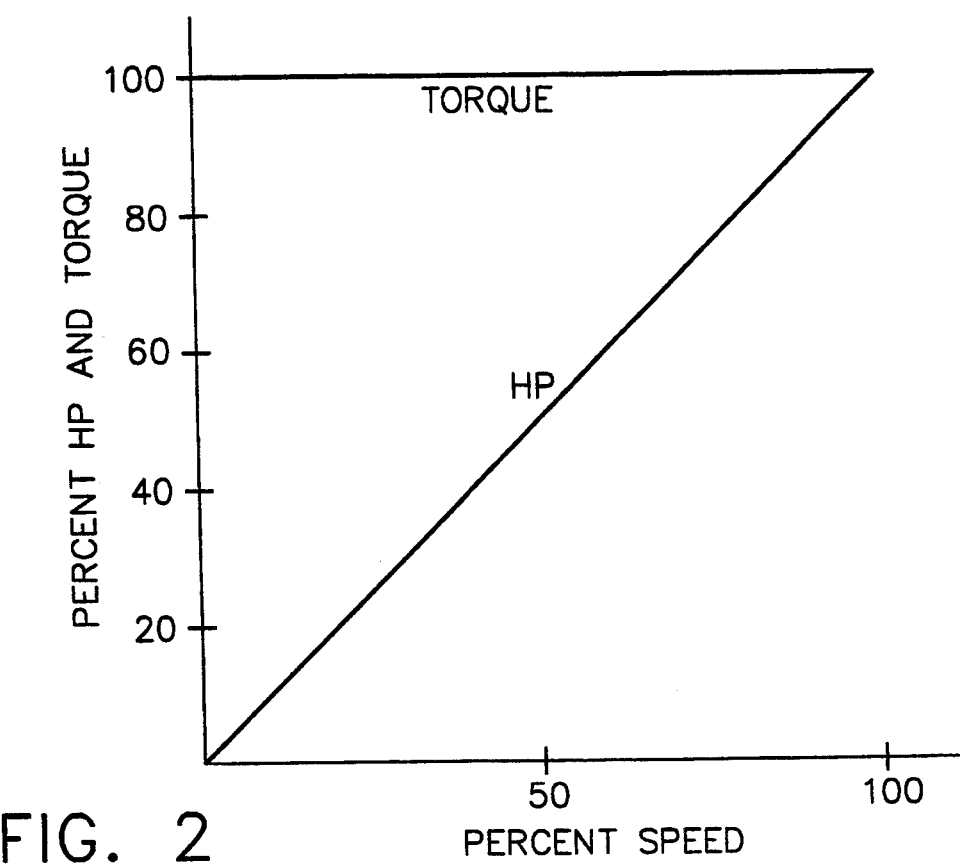
FIG. 2 illustrates the relationship between speed and torque in a permanent magnet DC motor.

In a typical permanent magnet DC motor the armature is on the rotor and the permanent magnets are in the stator. The commutator and brushes in the motor switch the polarity of the applied voltage through the rotor windings (armature) such that the flux angle between the rotating armature and the stator field flux is held at 90° by mechanical commutation, the DC motor will produce constant (rated) torque from zero speed to rated speed. FIG. 2 shows this relationship.

Figure 3:
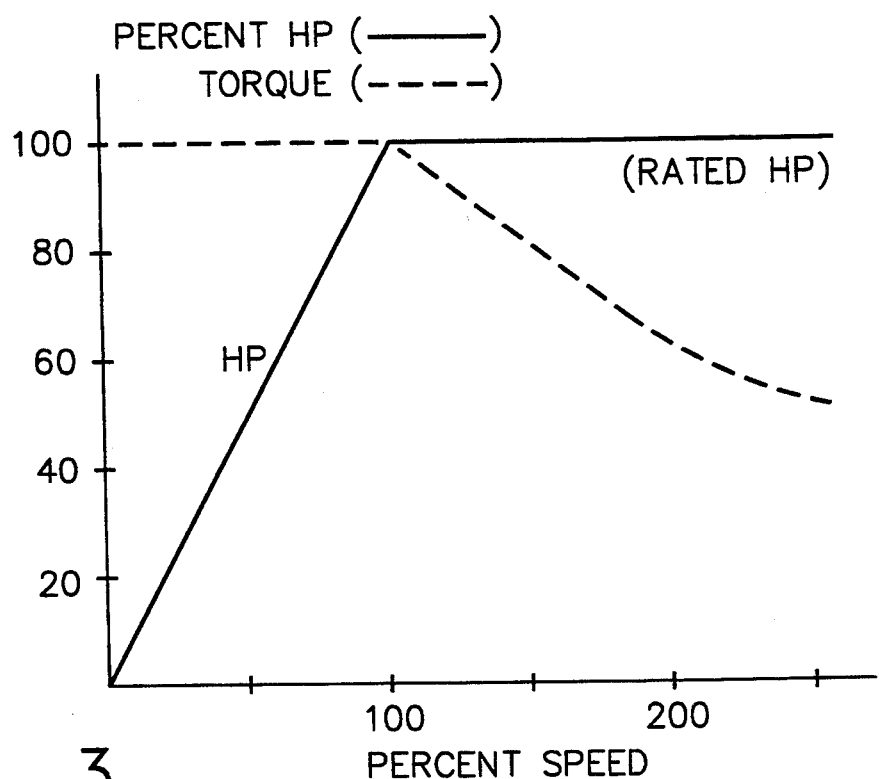
FIG. 3 illustrates the relationship between speed, torque and horsepower in a shunt wound DC motor.

In a shunt wound DC motor, the permanent magnets are replaced with an electromagnet. Like the permanent magnet motor, the electromagnetic field winding of a shunt wound motor is on the frame and the rotor carries the armature winding. These two windings are electrically independent, so the voltage applied to each of them can be controlled. When a voltage is applied to both of the windings a rotating magnetic field is created in the air gap between the rotor and stator. The amount of torque produced by the motor is proportional to the product of the armature and field currents up to the motors base speed. It will produce rated torque up to its rated speed. When it reaches rated speed the motor develops its rated HP, as shown in FIG. 3. Since some applications require the motor to run above its rated speed, it should be noted that, for constant HP, speed and torque are inversely proportional. If the field voltage and current are decreased, the speed of the armature will increase, and HP will remain constant, see FIG. 3. Applications which require higher than rated speed operation of the motor are generally referred to as constant HP applications.

Reducing or weakening the flux of one of the fields is termed field weakening. In a permanent magnet brushed motor, there is no control over the stator magnetic field so operation above rated speed is not possible without increasing armature voltage above its rated voltage.

Figure 1A:
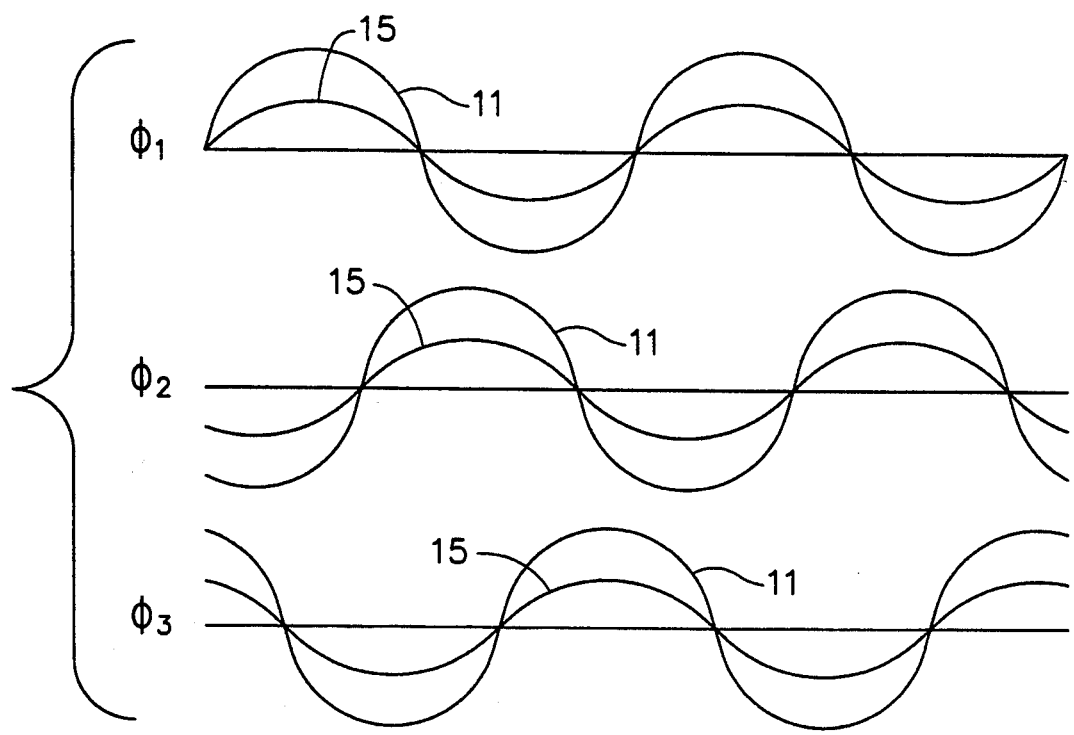
FIGS. 1a and 1b illustrate signals representing the induced EMF in the stator windings and the current signal applied to the stator windings for an AC synchronous servomotor and a brushless DC motor, respectively.
Figure 1B:
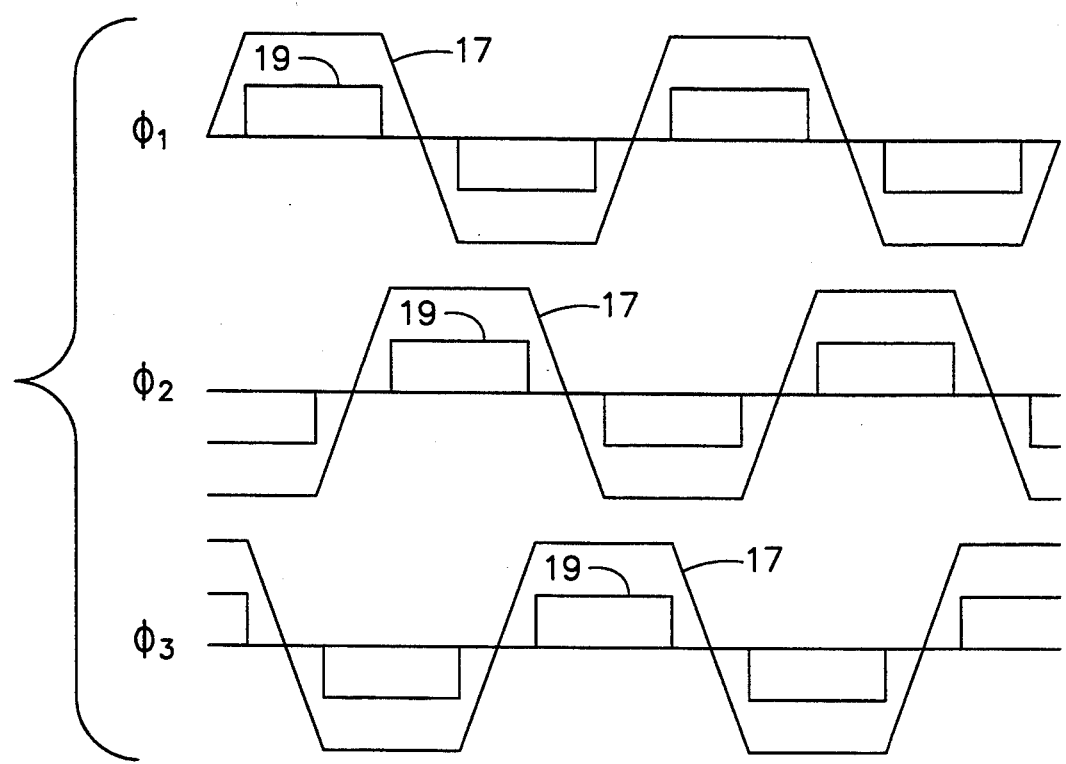
Figure 4:
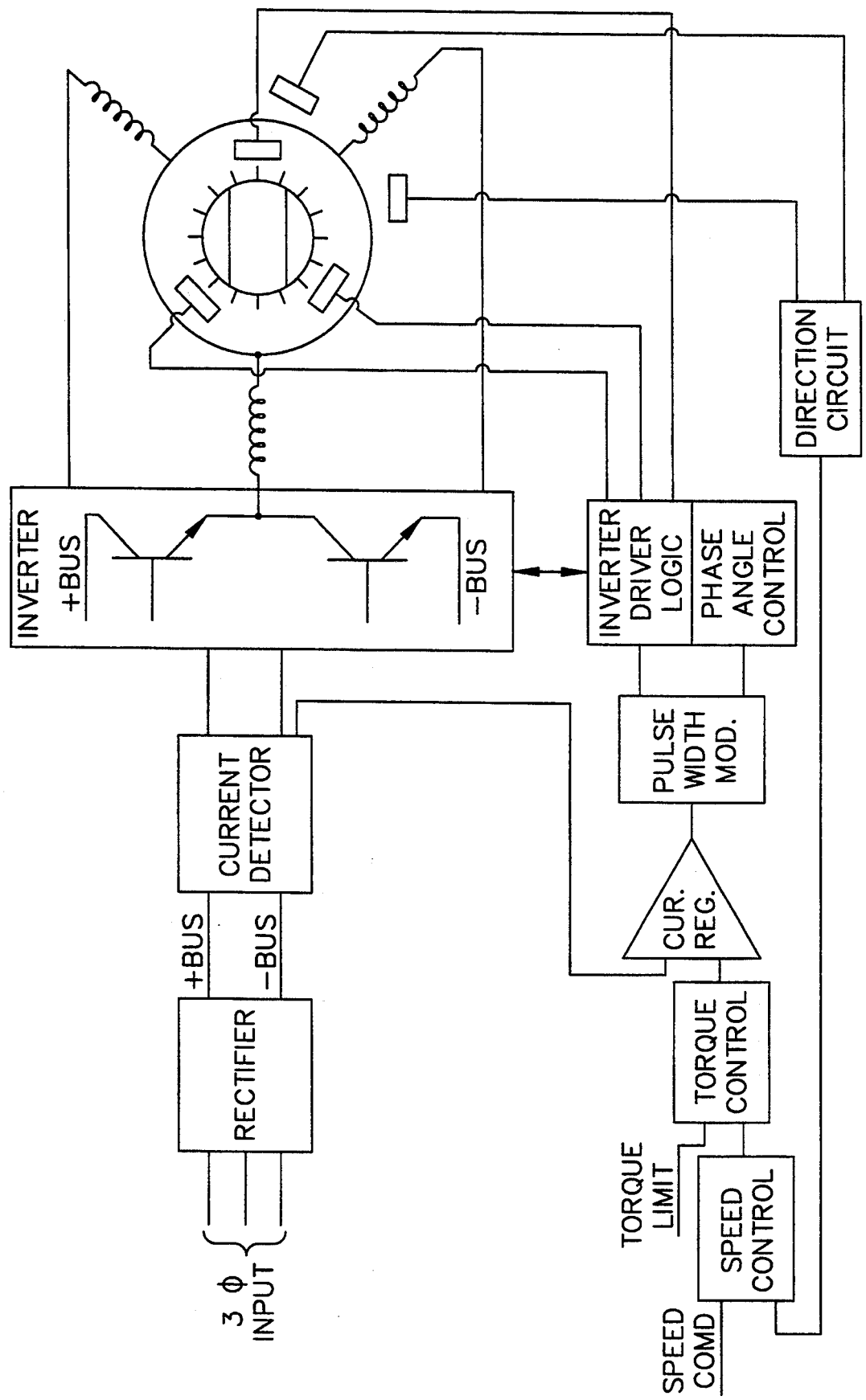
FIG. 4 is a block diagram illustrating the control circuit components typically used with a brushless DC motor.

Brushless DC motors are based on similar control methods; FIG. 4 is a block diagram illustrating the basic elements of a typical brushless DC motor control. In this construction, permanent magnets are fixed on the rotor and field windings are provided in the stator. Hall effect sensors are mounted on the stator housing and produce rotor position feedback signals each time a magnetic pole of the rotor passes the sensor. As earlier discussed, to obtain the desired speed and torque values, it is necessary to control the applied voltage and current flow, respectively, in the stator coils. The control typically utilizes the known technique of pulse width modulation (PWM) to obtain the desired voltage and current values. Therefore, through PWM, the desired applied voltage and current flow to the stator coils can be obtained. The net result is the application of blocks of current 19 in each phase as shown in FIG. 1(b) which produce a total motor current having a magnitude defined by the output of the current regulator.

Although torque control is not typically used, a brushless DC motor may be commanded under torque control. In that situation, a torque control responds both to a torque limit signal and to the velocity error signal and limits the velocity error signal to the torque limit signal. More specifically, under normal operation, when speed and torque are set, assuming the velocity error signal does not exceed the set torque signal, the motor control will bring the motor up to the set speed. As the load on the motor increases, the speed will start to reduce and the speed error signal will increase. The current regulator will supply more current to bring the motor back to the commanded velocity. As the load continues to increase, the speed error signal will reach the limit established by the torque limit signal. At that point, the motor is under torque control. The current regulator will then control the pulse width modulator to establish a current and torque in the motor corresponding to the torque limit. The torque limit signal may be varied, and current flow and motor torque changed in accordance therewith. When the torque control is not being used, the set torque signal is set to its maximum value.

The AC induction motor also produces torque by the interaction of two magnetic fields, but the way these fields are established in the air gap differs from a DC motor. In a three phase induction motor the windings are on the stator; there are 2 poles wound on the stator for each phase of a 2 pole motor, 4 for a 4 pole motor, and 6 for a 6 pole motor, etc. The rotor of the induction motor is constructed of bars which are shorted at their ends. When AC power is applied to the stator windings a rotating magnetic field is produced. As the magnetic field rotates, current is induced into the bars of the rotor causing it to produce torque and rotate. However, the angular alignment between the stator magnetic field and the field induced in the rotor is not necessarily 90°. Since the induction motor does not have a commutator/brush system to fix the angle of the magnetic fields at 90°, it will not inherently produce rated torque from zero speed to rated speed, as described for the DC motor (see FIG. 2).

For an induction motor to provide a controlled torque from zero speed to rated speed, electronic control means is required to keep the magnetic axes for stator (magnetizing) flux and rotor (torque producing) flux at 90°. This type of control is commonly referred as field oriented control, vector control or torque angle control; for consistency, vector control will be used throughout the specification to identify this type of electronic control. Vector control provides a form of electronic commutation of the flux fields, essentially simulating the mechanical commutator in a DC motor. Vector control adjusts the frequency and phase of the voltage and current applied to the motor to maintain the 90° phase relationship between the stator and rotor fluxes. This enables the motor to operate with high torque capability at all speeds, including speeds where torque control is not feasible for other controls systems, such as zero and above the synchronous speed.

Figure 6:
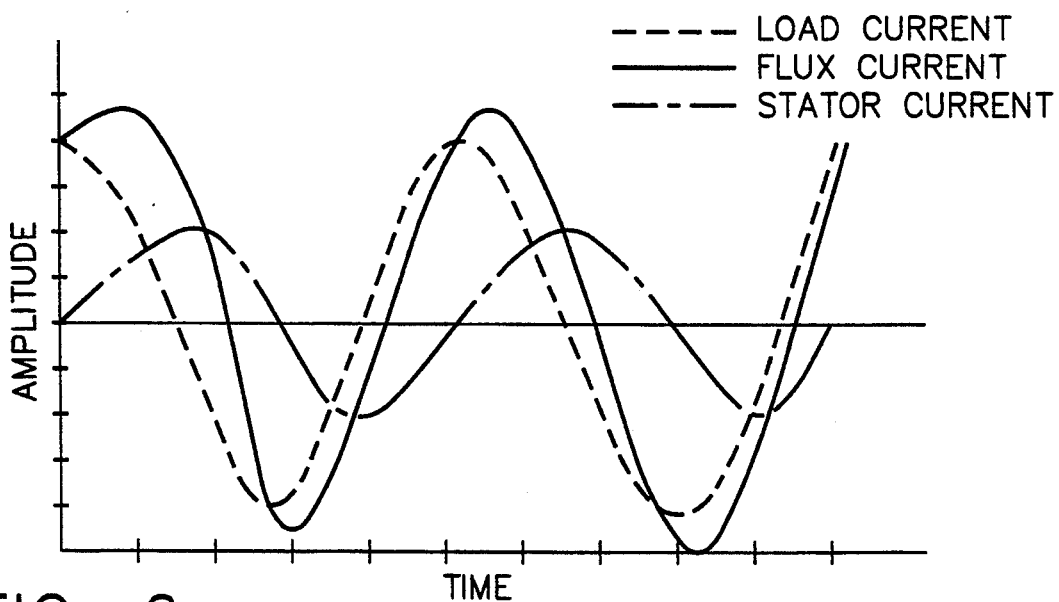
FIG. 6 illustrates the wave forms of the current components for flux and torque, and the resultant vector current waveform that is applied by vector control.

The vector controller decouples the current that will be applied to the motor in the 90° components of flux (magnetizing) and torque currents. These current components are vectorially added in the controller's CPU. FIG. 6 shows the wave forms of the current components and the resultant vector current waveform that is applied to the stator winding of the motor by the vector controller. The flux or magnetizing current component remains essentially fixed up to the rated speed of the motor and the component is metered to the motor in direct proportion to the applied load. Vector control of an induction motor provides rated torque at rated load from zero to rated speed of the motor. Peak torques of 150–300% are available for momentary loads depending upon the controller selected and the limitations of the motor. Constant HP operation above rated speed is also possible with a vector drive. The controller CPU reduces the flux current at speeds above the user programmed base speed to provide constant HP operation up to the speed limit of the motor or the maximum output frequency of the controller.

Figure 7:
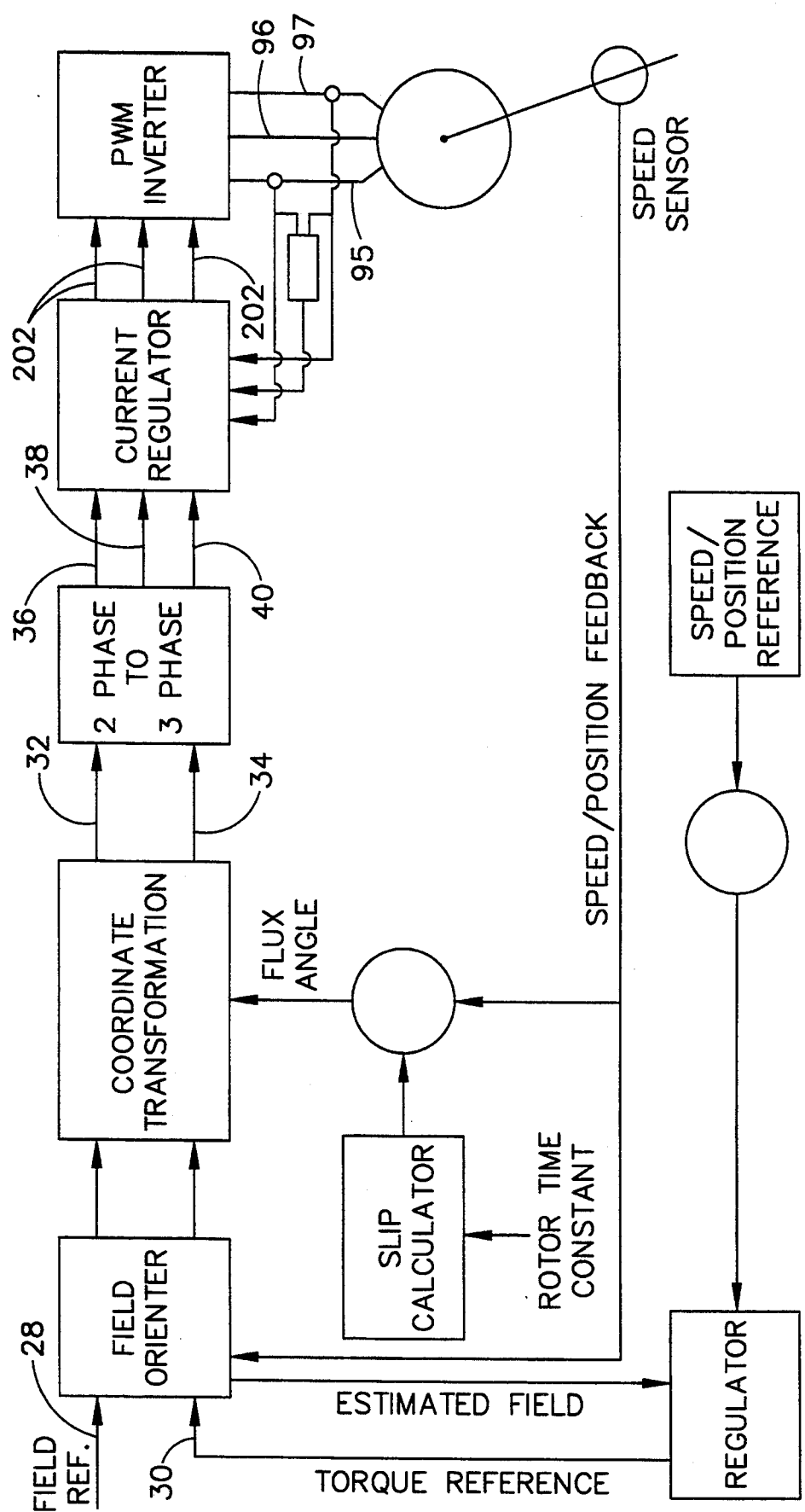
FIG. 7 is a block diagram illustrating the control circuit components typically used in connection with a vector controlled AC induction motor.

The overall block diagram for vector control of an AC induction motor is illustrated in FIG. 7. Although the basic AC motor is simple, variable-speed operation requires a more complex control method than the DC machine. The most common strategies of adjustable frequency motor drives rely on fixed relationships between voltage and frequency. They use resistors and capacitors in a discrete control loop or inner/outer control loops that slave one variable to another. These methods produce drives with limited performance compared with DC drives. They are suited mostly to applications such as fans and pumps, in which a 4:1 speed range is sufficient.

In contrast, the AC vector controller provides the equivalent of a "terminal" that allows application of a torque demand signal, a feature common AC control loops lack. The field orienter and 3-phase waveform generator, which are part of the controller logic, form this terminal. Control algorithms in the controller CPU replace discrete control loops.

If the position angle of the rotor flux is known, field orientation in induction machines can be implemented the same way as for synchronous machines. However, there are two essential differences between the two. First, unlike the synchronous motor, the position angle of the rotor flux in an induction motor is not a direct, measurable mechanical quantity. Second, the induction motor relies on stator current for both magnetizing and torque-producing components. In the synchronous machine, field current is independently controlled.

In the induction machine, stator current has two components, the flux (magnetizing) and torque-producing currents. To conform to the torque control requirements outlined earlier, these two components must be separated and independently controlled. In addition, the orthogonal relationship between the two currents must be maintained. Both amplitude and phase of the AC currents must be controlled to achieve the requirements outlined for torque control.

Figure 8:
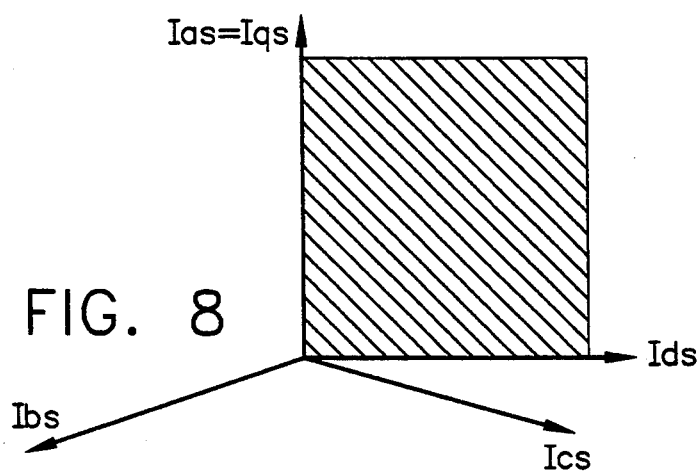
FIG. 8 illustrates a modeling procedure for finding a two-phase equivalent of a three phase motor.

In a three-phase machine, there are three stator and three rotor currents. FIG. 8 shows the common modeling procedure for finding a two-phase equivalent of the three-phase machine, thereby reducing the number of system variables. The q and d axes denote the two phases, with the shaded area between them emphasizing the right-angle relationship required to prevent interaction between flux and MMF magnetomotive force. The a, b, and c, axes represent the three-phase configuration. A similar transformation holds for voltages, fluxes, etc. and is equally applicable to both the stator and the rotor variables.

Suitable transformation by the controller CPU provides the torque- and flux-producing components of the stator currents from feedback of the stator currents and the speed of the reference frames. The resulting independent currents are compared with the relevant references. The respective errors set the magnitude and relative position of the stator current phasor. Then, an inverse transformation recovers information in stator reference frames.

Figure 9A:
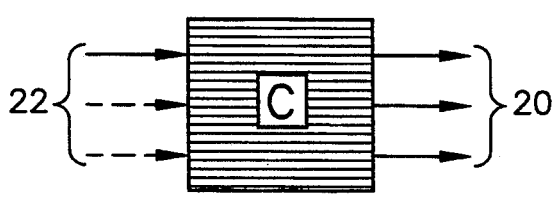
FIGS. 9a-9c illustrates the two steps involved in direct measurement of the rotor flux position angle in induction motors.
Figure 9B:
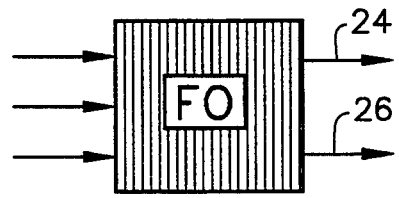
Figure 9C:
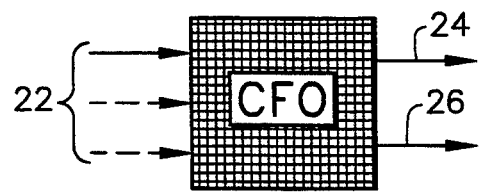

There are two basic approaches to determining the rotor flux position angle: (1) direct schemes that measure the angle electrically; and (2) indirect strategies that use the slip relation inherent in field orientation to compute the angle. Measurement of the flux angle requires two steps, illustrated in FIGS. 9a and 9b. First, a rotor flux computer, labeled "C", calculates the rotor flux components 20 from measurable quantities, i.e. motor input signals 22. Then, a field orienter "FO" computes the magnitude 24 and angle 26 of the rotor flux vector. These functions, which can be precisely linked in the control logic, provide critical information, such as flux angle, which permits coordinate transformation. Also, flux amplitude, which provides a basis for its regulation. Then, there is phase current information, which together with the flux amplitude permits calculations of instantaneous motor torque.

Because the direct method of field orientation depends on actual measurement of the rotor flux position angle, its implementation requires special motors and sensors. Therefore, indirect strategies are often chosen, eliminating the need for specialized motor hardware. An encoder or other speed sensor is the only addition to the standard induction motor for an indirect vector control scheme.

The control circuit shown in FIG. 7 is based on an indirect field orientation system using a CRPWM (current regulated pulse width modulated) inverter. The field orienter provides the torque and flux producing components 28, 30 of the current based on the feedback and references indicated. A synchronous-to-stator transformation converts the commanded currents 32, 34, 36, 38, 40 to stator-referred reference currents providing PWM trigger signals 202. Summing a rotor position signal and a slip position signal generates the field angle. A shaft (incremental) encoder provides rotor position directly and a slip calculator produces the slip position. In the CRPWM-based system of FIG. 7, several of the functions are actually part of the software in the controller CPU; these include field orientation, coordinate transformation, 2 to 3-phase calculation and slip calculation. In practice, all functions, except for the PWM inverter, would be performed by the controller using one or more CPUs.

As discussed previously in general terms, there are three independently controlled requirements for torque control: armature current, constant field flux, and a 90° angle between the flux axis and the MMF axis. To see how this system meets these requirements, the following observations can be made. It uses independent current control of the stator current in the same manner as the DC machine. Controlling the flux-producing current independent of the torque-producing current provides independent flux control. The stator current has two independently controlled components. Using one motor field angle, which is computed from rotor position and slip frequency, maintains the spatial orientation of the rotor flux with respect to the torque-producing current.

Figure 10:
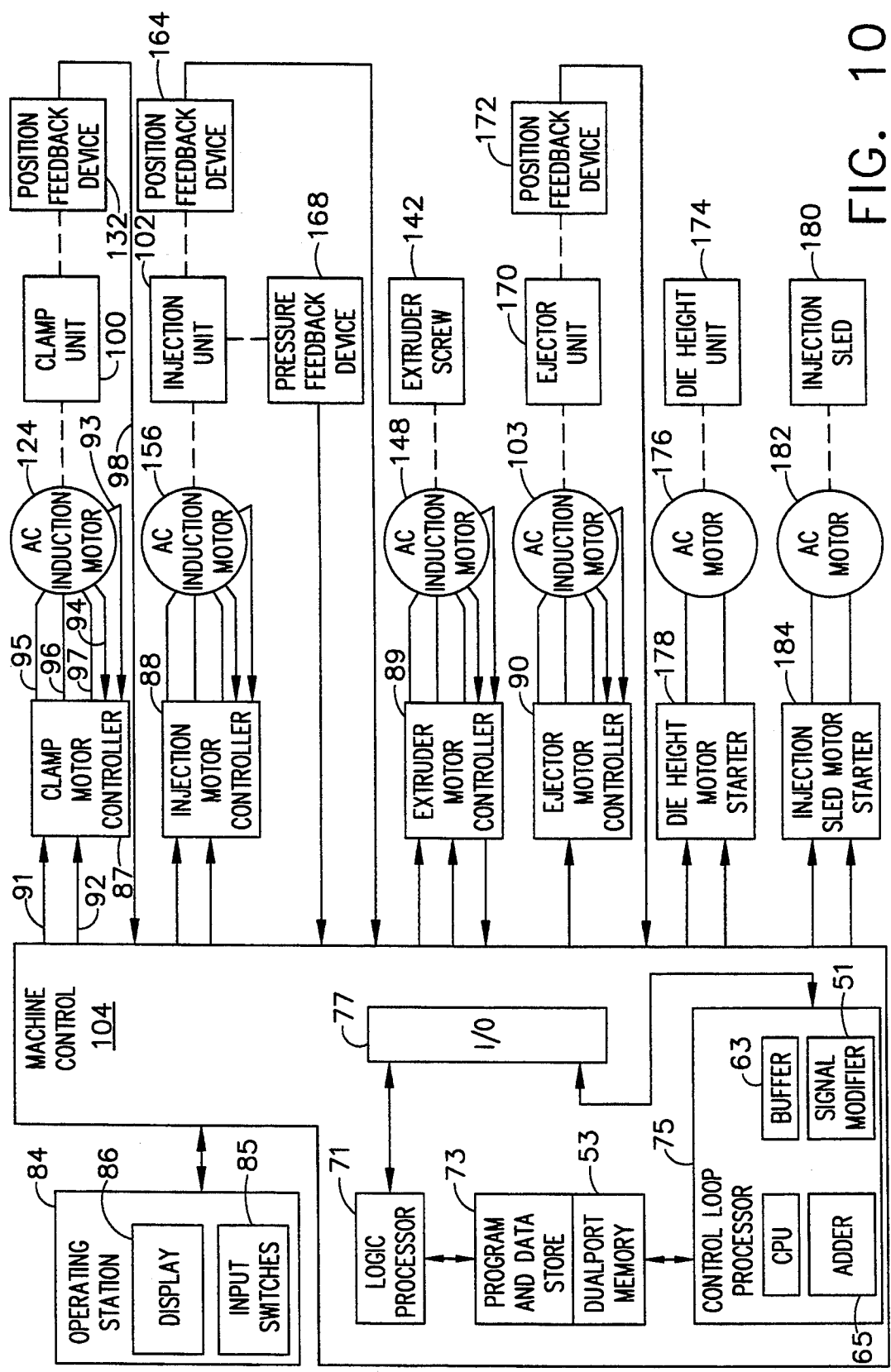
FIG. 10 is a schematic block diagram illustrating a control system including vector controlled AC induction motors for use on a typical injection molding machine.

FIG. 10 is a schematic block diagram illustrating the use of vector controlled AC induction motors as sources of motive power on a typical injection molding machine. A machine control 104 is connected to an operator station 84 which contains operator push-buttons and input switches 85 and a display device 86. The display device 86 on the operator station 84 may be limited to indicator lights or may be a color cathode ray tube or other panel display which can provide real time information as to the status of the injection molding cycle. The machine control 104 may be represented by any suitable control which provide closed-loop capability, such as the CAMAC series of injection molding machine controls manufactured and sold by Cincinnati Milacron Inc. An example of such a control is described in U.S. Pat. No. 4,745,541 which is expressly incorporated herein by reference. The control 104 is basically comprised of a logic processor 71 and associated program and data store 73. The store 73 typically contains memory for storing the operating system program for the logic processor 71 and memory for storing a sequence of logic instructions to be executed by the logic processor for providing a cycle of operation of the injection molding machine. The logic instructions are generally preprogrammed and loaded into ROM memory in the store 73. The store 73 further contains memory for storing data associated with the desired cycle of operation. The data may represent desired position, velocity, temperature, pressure or other data which represents set points or limits required to operate the machine to produce an acceptable part. The operator may modify the set point data through the operator station 84.

In executing the logic instructions the logic processor 71 controls the real time functions of the machine by producing via the I/O interface 77 velocity, torque and other set point command signals to the appropriate motor controllers and other machine devices to initiate a cycle of operation. The processor 71 receives position, velocity, pressure, temperature and other signals from the machine and operates with the control loop processor 75 to change the states of or terminate existing set point signals and/or produce new set point signals to the machine to continue the cycle of operation.

The store 73 also contains dual port memory 53 which is shared by the logic processor 71 and the control loop processor 75. One function of control loop processor 75 is to close a servoloop in the control 104. For example, the control loop processor 75 may read a velocity command signal from the dual port memory and store it in the buffer 63. The buffered velocity command signal is provided to the controller 87 to command motion of the clamp unit, a position feedback signal on line 98 representing the position of the clamp unit is received through a I/O interface 77. The control loop processor 75 algebraically sums in adder 65 the position feedback signal with a programmed position set point signal stored in the dual port memory portion of the store 73. When the resultant sum equal zero, i.e., the actual position of the clamp unit equals the programmed position, the control loop processor 75 terminates the existing velocity command signal to the controller 87 or provides a new velocity command signal to the buffer 63. Similarly, a pressure feedback signal may be received through I/O interface 77 from a pressure transducer 168 on the machine which measures the pressure on an extruder screw in the injection unit 102. The analogue pressure feedback signal is converted to a corresponding digital signal which is algebraically summed or compared in adder 65 with a programmed pressure set point or limit signal stored in the dual port memory portion of the store 73. If the actual pressure exceeds the pressure limit, the error signal representing the pressure difference may be used by the signal modifier 51 to modify or reduce a velocity command signal in the buffer 63. The control loop processor may be embodied using either digital or analogue technologies. The machine control 104 has other components, capabilities, and functions but a discussion of those is not required for an understanding of the present invention.

At the appropriate times in the cycle, velocity and torque set point signals are produced to the vector motor controllers 87, 88, 89, and 90. Those controllers are essentially identical in construction and operation to the vector controller described in FIG. 7. Briefly summarizing the operation of the clamp motor controller 87, a speed control within the motor controller responds to a velocity command signal on input 92 and a velocity feedback signal on line 93 from the AC induction motor 124 to produce a velocity error signal. Similarly, within the controller 87, a torque control is responsive to a torque limit signal on input 91 and a motor current feedback signal created within the controller 87 to produce a torque error signal. A pulse width modulator responds to either or both of the error signals as determined by the controller 87 to produce a modulated output signal to inverter drive logic. The inverter drive logic in controller 87 responds to a rotor position signal online 94 produced by Hall effect sensors, or other suitable sensing devices on the clamp motor 124 to control the switching of inverter power transistors, thereby producing three-phase drive signals on lines 95, 96, and 97 connected to the stator coils of the motor 124.

The motor 124 is mechanically coupled to a clamp unit 100 and causes relative motion between the clamp members. A position feedback device 132 is connected to the clamp unit to produce a position feedback signal on line 98 representing the position of a movable clamp member. Further, the controller 87 may also produce a velocity feedback signal to the machine control 104 representing the angular velocity of the motor 124. Although velocity feedback signals may be produced by any or all of the controllers, it is illustrated in FIG. 10 as being produced by the extruder motor controller 89 on line 101. The operation of motor controllers 88, 89, and 90 and their respective servomotors 156, 148, and 103, are similar to the operation of the clamp motor controller 87 and AC induction motor 124 just described. One additional signal which is utilized in controlling the injection unit during pressure profiling is a pressure feedback signal from pressure transducer 168, which is input into the machine control 104 and allows direct measurement of injection pressure.

Figure 11:
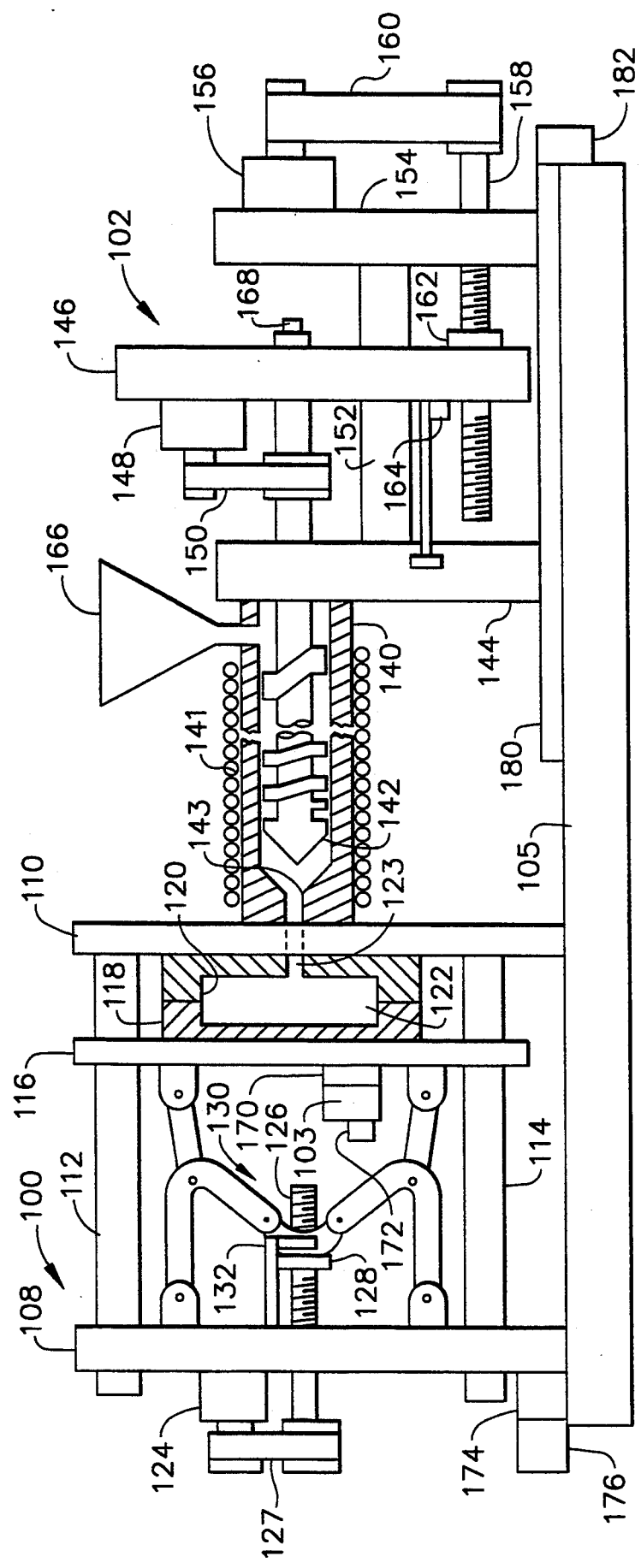
FIG. 11 illustrates the overall structural components for one type of injection molding machine to which vector controlled AC induction motors can be applied.

FIG. 11 illustrates an injection molding machine to which AC induction motors are applied. The machine is comprised of a clamp unit 100 and an injection unit 102, each mounted on a base 105.

The clamp unit 100 is comprised of rectangular stationary platens 108 and 110 which are connected by four tie bars at the platen corners. Two tie bars 112 and 114 are shown. The tie bars operate as guides for a movable platen 116. Mold halves 118 and 120 are affixed to the platens 116 and 110, respectively; and when the clamp is in the closed position shown, a mold cavity 122 is formed between the mold halves. A gate opening 123 passes through mold half 120 and stationary platen 110 to permit the injection of a plastic melt into the mold cavity 122. The moving platen is operated by an AC induction motor 124 mounted on the stationary platen 108. The motor is connected to a ball screw 126 by a belt coupling 127. A gear drive or other mechanical coupling may also be used. The ball screw nut 128 is mounted in a toggle mechanism 130 which provides a mechanical advantage for the motor 124 in operating the clamp unit 100. The position feedback device 132, such as a linear potentiometer, provides a signal representing the position of the movable platen 116 relative to the stationary platen 108.

The injection unit 102 includes an extruder mechanism comprised of a tubular barrel 140 with an extruder screw 142 rotationally and translationally mounted therein. The screw is journalled in the stationary member 144, and one end of the screw 142 is rotatably secured in the movable member 146. Rotational motion of the screw 142 is provided by the motor 148 mechanically connected to the screw by a belt coupling 150, which may also be implemented by any other suitable mechanical coupling. The movable member 146 rides on a pair of parallel bar guides, one of which is shown at 152, connected between the stationary members 144 and 154. An AC induction motor 156 mounted on the member 154 is connected to a ball screw 158 by a belt coupling 160 or the like. The ball screw nut 162 is mounted in the movable member 146; and therefore, the motor 156 is operative to provide linear motion to the member 146 and the extruder screw 142 toward and away from the stationary platen 110. A position feedback signal representative of the position of the member 146 is obtained from a conventional feedback device 164, typically shown as a linear potentiometer.

Referring to FIGS. 10 and 11, there are several other motors typically used on an injection molding machine. The ejector unit 170 is integrated with the mold and is operative to eject the finished molded part as the mold opens. The ejector unit is coupled to an AC induction motor 103 which is connected to a motor controller 90. The machine control 104 provides a velocity set point signal to the controller 90 at the appropriate time in the injection molding cycle and also in response to an ejector position feedback signal from the feedback device 172. The ejector unit is under servocontrol to accommodate the various requirements and operations of different molds.

A die height unit 174 is typically integrated into the tie bars and platen 108 shown in FIG. 11. The die height unit provides an adjustment of the spacing of platen 108, including toggle mechanism 130 and movable platen 116, relative to the stationary platen 110 to accommodate different molds having different mold thicknesses when the molds are in the closed position. The die height unit is controlled by an AC motor 176 which is connected to a motor starter 178. The die height adjustment is manually controlled by the operator which results in the machine control 104 producing forward or reverse command signals to the motor starter 178.

The injection sled 180 generally rides on tracks (not shown) on the base 105 and supports the entire injection unit 102, thereby permitting the injection unit to be moved toward and away from the stationary platen 110. The injection sled is mechanically coupled to an AC induction motor 182 which is connected to a motor starter 184. Again, the operation of this unit is manually controlled by the operator which results in the machine control 104 providing forward or reverse command signals to the motor starter 184. It should be noted that although motors 176 and 182 are identified as being AC, they are merely general purpose motors and could be brushed AC or DC, brushless (permanent magnet) AC or DC, or AC induction, as might be best suited for the particular application. In fact, it is intended that the control of the present invention will accommodate any combination of motor types in order to optimize machine performance.

Referring to FIGS. 10 and 11, a cycle of operation will briefly be described starting with the clamp unit 100 in the illustrated closed position. Also as illustrated, solid thermoplastic, thermoset or other material from the hopper 166 will have been plasticized by the screw 142 to form a liquid phase plastic melt or shot in front of the screw. Plastication time is optimized by providing external heat to the barrel 140, typically by a plurality of circumferentially mounted heater bands 141. To initiate an injection cycle, the machine control 104 provides a velocity command to the motor 156 in order to move linearly member 146 and screw 142 towards the platen 110. Several velocity command signals may be given by the machine control 104 to control the linear velocity of the screw 142 as a function of the position of the screw 142 relative to the platen 110, as detected by the position feedback device 164. As the screw 142 moves linearly in the barrel 140 toward the stationary platen 110, the plastic melt is injected through the orifice 143 and gate opening 123 into the mold cavity 122. The screw position defining the end of the linear motion of the screw 142 is then detected by position feedback device 164, and the machine control 104 transfers to the pack cycle. Alternatively, the machine control 104 may transfer to the pack cycle at the end of a predetermined period of time or when the pressure as measured by the pressure transducer 168 exceeds a predetermined pressure limit. During the injection cycle in the subsequent pack and hold cycles, the extruder motor controller 89 is provided with a zero velocity signal and a maximum torque command signal. Those signals are necessary to keep the extruder screw from rotating in the presence of the linear forces exerted on the screw during the injection, pack, and hold cycles.

During the pack cycle, the machine control provides a velocity command signal and one or more torque command signals for predetermined periods of time. The object is to continue to push the material into the mold to complete the mold filling process. The motor controller 88 will provide current to the motor 156 in order to achieve the velocity command. However, based on the motor current feedback which is proportional to torque, the motor torque control will limit the current so that the commanded torque is not exceeded. At the end of a predetermined period of time, marking the end of the pack cycle, the machine control 104 transfers to the hold cycle. Again, the machine control provides a predetermined velocity command signal and one or more torque command signals for predetermined periods of time which provide a torque limit profile during the hold cycle. After a predetermined period marking the end of the hold cycle the machine control 104 transfers to a cooling cycle during which there is no torque or velocity command signals for a further period of time while the molded part cools.

During the cooling cycle, the machine control 104 initiates an extruder run cycle in which the extruder motor 148 is run to extrude a new shot of molten material to the front of the screw 142. At the same time, the motor 156 must be operated to move the screw 142 away from the platen 110 while maintaining a predetermined pressure on the molten plastic material or a predetermined back-pressure on the extruder screw 142. The machine control 104 provides a velocity command to the controller 89 to cause the extruder screw motor 148 to rotate the screw to plasticize more plastic material and carry it to the front of the screw adjacent to the orifice 143. At the same time, the machine control provides a zero velocity command and a torque limit command to the motor controller 88 to cause the motor 156 to refrain from rotation but to maintain a predetermined back-pressure on the screw 142. As pressure builds up on the front of the screw, the controller 88 will have to supply more current to the motor 156 to maintain the zero velocity, i.e., to keep the motor from rotating. When the current detector in the motor controller senses a current representing a torque greater than the torque command, the torque control within the controller 88 overrides the velocity control, and the motor is allowed to rotate. The motor rotation will move the screw 142 away from the platen 110 and reduce the back-pressure to the commanded torque limit. Consequently, as the screw 142 rotates to build a shot of molten plastic, the screw will be moved away from the platen 110 to maintain a predetermined back-pressure on the screw.

The machine control 104 may provide one or more velocity commands to the controller 89 and one or more torque commands to the controller 88 as a function of the position of the extruder screw 142 as detected by the feedback device 164. When the screw 142 reaches a predetermined final position, the machine control stops the operation of the extruder motor 148 and issues a velocity command to the controller 88 to move the screw further to remove the pressure from the molten plastic material and the back-pressure from the screw 142. At the end of the molded part cooling cycle, the control 104 also provides a velocity command signal to the motor 124 to move the movable platen 116 in the direction away from the stationary platen 110 to open the mold. Different velocity command signals may be given to provide predetermined acceleration and deceleration of platen 116 depending on its position as detected by the position feedback device 132. While the mold is opening, the control will provide velocity command signals to an ejector unit 170 which includes an ejector motor 103 that actuates the mold part ejector mechanism (not shown) that can be carried by the mold half 118. The operation of the ejector motor 103 is controlled by a motor controller 90 that receives velocity command signals from machine control 104. The control 104 also receives an ejector position feedback signal from position feedback device 172 to control the position of the part ejector mechanism (not shown). The different velocity commands are provided as a function of the position of the ejector mechanism as detected by the position feedback unit 172. The finished part is ejected from the mold; and then, under control of velocity commands which are provided by the machine control 104 as a function of the position of the ejector mechanism as detected by the position feedback unit 172, the ejector motor 103 returns the part ejector mechanism to its original position.

When a fully opened mold clamp position is detected, the control 104 gives velocity command signals to begin to moving the platen 116 in the opposite direction to again bring the mold halves together. The control 104 will generate several velocity commands depending on the position of the platen 116 to control acceleration and deceleration and bring the mold halves into controlled contact. For example, movable platen 116 may initially be moved at a rapid rate toward stationary platen 110 to reduce overall cycle time until a predetermined position is reached. Thereafter, a velocity command representing a low velocity is provided the controller 87 until another position is detected by the feedback device 132. The machine control 104 then provides a velocity command with a low valued torque command signal. Under normal circumstances, the mold halves will be brought together to the fully closed position as detected by the feedback device 132. However, if there is interference between the mold halves, the torque limit control will override the velocity control and reduce current to the motor to reduce motor velocity and motion to protect the mold halves from damage caused by the interference.

Assuming the mold halves reach the fully closed position, the torque command value is increased, and a velocity command is given to move the toggle to a lock-over position as shown in FIG. 11. The mold clamping force is determined and controlled by the final position of the toggle mechanism 130 which is detected by the feedback device 132.

Although the previously described control sequence will effectively operate an injection molding machine, an alternative approach may be used to improve machine performance. For some portions of the machine cycle, there may be torque pulsations or surges during motor operation; this tends to be more noticeable at lower speeds and can cause variations in finished part characteristics. To minimize the torque pulsations, pressure or another variable representing a process or machine force may be controlled using the servomotor velocity loop.

For example, torque pulsations in the injection motor cause periodically similar variations in pressure between the extruder screw and the molten material. Those pressure variations about a pressure set point may be used to modify inversely a velocity command signal such that when the pressure increases, the velocity command signal is decreased and vice versa. The result is that the pressure variations caused by torque pulsations can be substantially reduced by using the servomotor velocity loop to control pressure. The pressure feedback signal is used by the control loop processor 75 to close a pressure loop within the control 104 (see FIG. 10). The closed loop processor 75 compares a pressure feedback signal from the pressure transducer 168 with a programmed pressure set point or limit and produces an error signal representing the algebraic difference between the pressure limit and the pressure feedback signal. That error signal is used to modify a velocity command signal from the logic processor 71. Hence, the servomotor velocity loop within the motor controllers is controlled by a pressure control loop within the control 104.

Referring again to FIGS. 10 and 11, during the injection cycle, control loop processor 75 in the machine control 104 provides velocity command signals as a function of the position of the extruder screw 142. Further, the control loop processor 75 compares the programmed pressure limit with the actual pressure as represented by the pressure feedback signal. As long as the actual pressure remains equal to or less than the pressure limit, the machine remains under velocity control and the controller 88 will operate to move the extruder screw at a velocity equal to the velocity command signal. However, when the actual pressure exceeds the pressure limit, the control loop processor 75 switches to a pressure control mode in which the velocity command signal is reduced in proportional to the magnitude of the pressure error signal. The control loop processor will continue to control the magnitude of the velocity command signal until the actual pressure again is equal to or less than the pressure limit, at which point the motor controller 88 is again under the exclusive control of the velocity command signal. The injection cycle continues under velocity or pressure control as described above until an extruder screw position is reached which causes the machine control to transfer to the pack cycle.

As previously described, during the pack cycle, the machine control 104 provides one or more torque command signals over predetermined periods of time. Using the alternative of pressure feedback, the servomotor torque control is not used. Instead, the control loop processor 75 provides a velocity command signal and one or more pressure set point signals over predetermined periods of time. The control loop processor functions as described relative to the injection cycle. The processor 75 provides the programmed velocity command as long as the actual pressure is equal to the pressure set point. However, if the actual pressure varies from the pressure set point, the control loop processor modifies the velocity command signal as a function of the pressure error signal. After a predetermined period of time defining the pack cycle, the control 104 transfers to the hold cycle. Instead of using torque control as previously discussed, the hold cycle can be controlled by modifying the servomotor velocity control as a function of extruder screw pressure.

As noted earlier with respect to FIGS. 10 and 11, the extruder run cycle requires that the extruder screw rotate to build up a quantity of plastic melt in front of the screw. At the same time, the motor 156 is provided a zero velocity signal with a torque limit command to maintain a predetermined back pressure on the screw. In the alternative control approach, a velocity command is provided but the servomotor torque control is not used. Instead, as previously described, a pressure control loop is closed within the control 104 and used to modify the velocity command signal if the actual pressure on the extruder screw varies from the pressure set point.

By using the alternative approach of controlling the injection servomotor velocity loop as a function of extruder screw pressure as opposed to injection motor torque control, the torque pulsations of the motors in an injection molding machine can be substantially reduced. The total effect is to reduce pressure fluctuations and substantially improve pressure control performance on an injection molding machine utilizing vector controlled AC induction motors.

Figure 5:
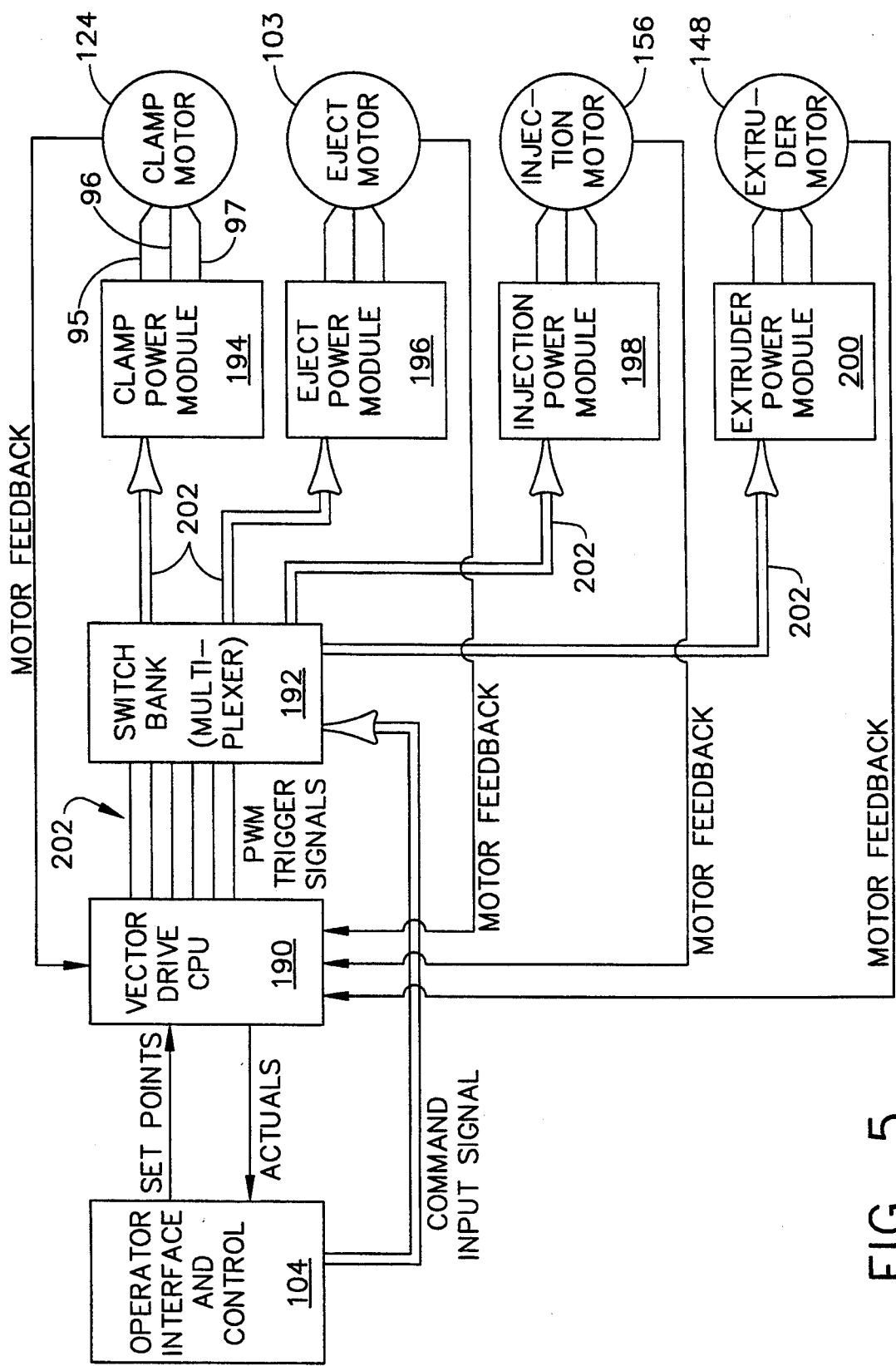
FIG. 5 is a block diagram illustrating the multiplexing of the controller CPU for the power modules of the motors.

One of the drawbacks to implementing vector control in injection molding machines is that the computer section for this type of control system is very complex and expensive. To reduce the expense and complexity of the system, the vector control for the motor drives can be configured to run multiple motors, potentially all of the motors in an injection molding machine, one or more at a time. This would be accomplished by multiplexing the computer controller circuits for each motor's power sections, as shown by the block diagram of FIG. 5. In effect, the motor controllers 87, 88, 89 and 90 (FIG. 10) are divided into a CPU section and a power section (module), so that one CPU section 190 can be used to support four power modules 194, 196, 198 and 200. The CPU section 190 includes essentially all of the control circuit elements shown in FIG. 7 except for the inverter, which is included in each of the power modules 194, 196, 198 and 200. By sharing the CPU section 190 between several motors and power transistors, a significant cost savings is realized without sacrificing machine performance.

By capitalizing on the fact that a typical injection molding machine generally activates the motors for the various axes one at a time, the controller CPU 190 is effectively shared (multiplexed) between the power amplifier sections of each drive axis. This multiplexing capability would require a switch bank 192 to switch the PWM trigger signals 202 from the CPU section 190 of the vector controller to the power amplifier section (power module) 194, 196, 198, 200 of the machine axis for which movement is required. The switch bank 192 performs the multiplexing by directing the one set (six) of PWM (transistor) trigger signals 202 from the CPU section 190 to the appropriate power module(s) 194, 196, 198, 200. The command input signals for the switch bank 192 could come from the machine control 104 or from a separate programmable logic controller that is sequencing the machine. The switch bank 192 could include either mechanical or solid state switches; regardless of the type of switch, there must be the ability to switch based on an external command input signal.

It should be noted that the multiplexing and associated switching previously described are equally applicable to the drive systems of other types of electronically controlled motors, such as permanent magnet AC and DC brushless motors. In a brushless DC motor, for example, the computer section would include the circuit elements shown in FIG. 4 (rather than the vector drive circuitry); as before, the inverter would be included in each of the separate power modules.

As previously mentioned, AC permanent magnet servomotors have been applied to injection molding machines, but their use results in several inherent disadvantages. First, AC servomotors have been designed for high servomechanism performance and have been typically applied to machine tools, robots, and other industrial equipment. The high servomechanism performance characteristics are desired because of the greater positioning accuracies required in those applications. That, in turn, leads to servomotor designs which minimize inertia, size, and consequently power. The complexity of the control and the cost of rare earth magnets adds significantly to the price of AC servomotors. Further, in high load applications where greater motor power is required, two or more motors must be ganged together, which further increases cost. Moreover, the ganging together of AC servomotors adds additional problems in the mechanics and control and may adversely effect efficiency.

Returning to FIG. 11, a vector controlled AC induction motor is particularly useful as the clamp motor 124. As the size of the injection molding machine increases to a larger size to produce larger parts, e.g. 500 tons or more of clamping force, two or more AC permanent magnet servomotors are required to be ganged together in order to obtain the desired mold clamping forces. With an AC induction motor, only a single motor is required to operate satisfactorily the clamp for a wider range of machine sizes, including machines of over 500 tons of clamping force.

Similarly, conventional permanent magnet servomotors are being used for the injection unit motor 156 and the extruder motor 148. Again, the AC induction motor can be controlled exclusively with the vector control; and for larger machine sizes, only a single motor would be required as opposed to a plurality of AC permanent magnet servomotors.

The application of vector controlled AC induction motors to injection molding machine servo systems has been rejected by others who have followed the traditional beliefs that permanent magnet servomotors are required to obtain satisfactory performance in sophisticated industrial equipment.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims.

What is claimed is:

1. An injection molding machine for producing a molded part by injecting a molten material into mold elements forming a mold cavity defining the molded part, the machine comprising:
   (a) clamp means for supporting and moving the mold elements between open and closed positions;
   (b) injection means for injecting the molten material into the mold cavity, said injection means including a screw member rotatably and translatably carried in a tubular barrel having an end in communication with the mold cavity;
   (c) first drive means mechanically coupled to the clamp means for imparting relative motion to the mold elements;
   (d) second drive means mechanically coupled to the injection means for rotating the screw member;
   (e) third drive means mechanically coupled to the injection means for translating the screw member within the tubular barrel;
   (f) wherein at least one of the first drive means, the second drive means, and the third drive means further includes
      (1) an AC induction motor having a rotor, a stator comprised of a plurality of sets of three phase windings, and means for detecting angular positions of the rotor, and
      (2) vector controller means for controlling the AC induction motor in response to a motor command signal, the vector controller means being connected to the AC induction motor and including
         (i) a CPU for calculating torque and flux producing components of current passing through the stator windings,
         (ii) current controller means for producing pulse width modulated trigger signals based on the CPU calculations to regulate the current, and
         (iii) power amplifier means for receiving the pulse width modulated trigger signals and applying a controlled current to the stator windings to produce a commutation effect thereby creating a controlled torque and speed for the AC induction motor; and
   (g) machine control means connected to the vector controller means for producing the motor command signal.

2. The apparatus of claim 1 wherein at least another of the first drive means, the second drive means and the third drive means comprises:
   (a) an AC induction motor having a rotor, a stator comprised of a plurality of sets of three phase windings, and means for detecting angular positions of the rotor; and
   (b) vector controller means connected to the AC induction motor for controlling the motor, the vector controller means including
      (1) a CPU for calculating torque and flux producing components of current passing through the stator windings,
      (2) current controller means for producing pulse width modulated trigger signals based on the CPU calculations to regulate the current, and
      (3) power amplifier means for receiving the pulse width modulated trigger signals and applying a controlled current to the stator windings to produce a commutation effect thereby creating a controlled torque and speed for the AC induction motor.

3. The apparatus of claim 2 wherein the vector controller means of each drive means shares a common CPU connected to multiplexing means for switching the pulse width modulated trigger signals produced by the current controller means to the power amplifier means for each AC induction motor based on an external command input signal.

4. The apparatus of claim 1 wherein each of the first drive means, the second drive means and the third drive means comprises:
   (a) an AC induction motor having a rotor, a stator comprised of a plurality of sets of three phase windings, and means for detecting angular positions of the rotor; and
   (b) vector controller means connected to each AC induction motor for controlling each motor, the vector controller means including
      (1) a CPU for calculating torque and flux producing components of current passing through the stator windings,
      (2) current controller means for producing pulse width modulated trigger signals based on the CPU calculations to regulate the current, and
      (3) power amplifier means for receiving the pulse width modulated trigger signals and applying a controlled current to the stator windings to produce a commutation effect thereby creating a controlled torque and speed for the AC induction motor.

5. The apparatus of claim 1 further comprising:
   (a) ejector means for ejecting the molded part from the mold cavity;
   (b) die height means for adjusting the clamp means relative to the mold elements;
   (c) injection sled means for positioning the injection means relative to the mold elements;
   (d) fourth drive means mechanically coupled to the ejector means for imparting motion to the molded part;
   (e) fifth drive means mechanically coupled to the die height means for adjusting the position of the clamp means;

(f) sixth drive means mechanically coupled to the injection sled means for imparting relative motion to the injection sled means;

(g) wherein at least one of the fourth drive means, the fifth drive means, and the sixth drive means further includes
   (1) an AC induction motor having a rotor, a stator comprised of a plurality of sets of three phase windings, and means for detecting angular positions of the rotor, and
   (2) vector controller means for controlling the AC induction motor in response to a motor command signal, the vector controller means being connected to the AC induction motor and including
      (i) a CPU for calculating torque and flux producing components of current passing through the stator windings,
      (ii) current controller means for producing pulse width modulated trigger signals based on the CPU calculations to regulate the current, and
      (iii) power amplifier means for receiving the pulse width modulated trigger signals and applying a controlled current to the stator windings to produce a commutation effect thereby creating a controlled torque and speed for the AC induction motor; and (h) machine control means connected to the vector controller means for producing the motor command signal.

6. The apparatus of claim 5 wherein the vector controller means of each drive means shares a common CPU connected to multiplexing means for switching the pulse width modulated trigger signals produced by the current controller means to the power amplifier means for each AC induction motor based on an external command input signal.

7. The apparatus of claim 1 wherein the commutation effect creating a torque on the rotor produces periodic torque pulsations thereby causing deviations in a process variable in response to the torque pulsations, and wherein the machine control means further comprises means for controlling the process variable by modifying the motor command signal in response to the deviations in the process variable caused by the torque pulsations.

8. The apparatus of claim 1 wherein the commutation effect creating a torque on the rotor produces periodic torque pulsations thereby causing deviations in a process variable in response to the torque pulsations, and wherein the machine control means further comprises:
   (a) means for producing a process feedback signal representing the process variable changing in response to the torque pulsations;
   (b) means for providing a set point signal representing a predetermined value of the process variable; and
   (c) means responsive to the set point signal and the process feedback signal for modifying the motor command signal in response to changes in the process variable from the predetermined value thereby reducing the deviations in the process variable caused by the torque pulsations.

9. An injection molding machine for producing a molded part by injecting a molten material into a mold cavity defining the molded part, the machine comprising:
   (a) injection means for injecting the molten material into the mold cavity, said injection means including a screw member rotatably and translatably carried in a tubular barrel, the tubular barrel having an end in communication with the mold cavity;
   (b) first drive means mechanically coupled to the injection means for translating the screw member within the tubular barrel, the first drive means including;
      (1) an AC induction motor having a rotor, a stator comprised of a plurality of sets of three phase windings and means for detecting angular positions of the rotor; and
      (2) vector controller means for controlling the AC induction motor in response to a velocity command signal, the vector controller means being connected to the AC induction motor and including
         (i) a CPU for calculating torque and flux producing components of current passing through the stator windings,
         (ii) current controller means for producing pulse width modulated trigger signals based on the CPU calculations to regulate the current, and
         (iii) power amplifier means for receiving the pulse width modulated trigger signals and applying a controlled current to the stator windings to produce a commutation effect thereby creating a controlled torque and speed for the AC induction motor with periodic torque pulsations;
   (c) means for producing a process feedback signal representing a non-velocity variable changing in response to the torque pulsations; and
   (d) machine control means connected to the vector controller means and the means for producing the process feedback signal for controlling the machine, the machine control means including
      (1) means for producing the velocity command signal representing a predetermined motor velocity,
      (2) means for providing a set point signal representing a predetermined value of the non-velocity variable,
      (3) means responsive to the set point signal and the process feedback signal for generating an error signal for representing the difference between the set point signal and the process feedback signal, and
      (4) means responsive to the error signal for modifying the velocity command signal as a function of the error signal thereby reducing changes in the non-velocity variable caused by the torque pulsations.

10. The apparatus of claim 9 wherein the means for producing a process feedback signal further comprises means for producing a pressure feedback signal representing a pressure exerted against the screw member by the molten material.

11. An injection molding machine for producing a molded part by injecting a molten material into a two-part mold having a cavity defining the molded part, the machine comprising:
   (a) injection means for injecting the molten material into the mold cavity, said injection means including a screw member rotatably and translatably carried in a tubular barrel, the tubular barrel having an end in communication with the mold cavity;
   (b) first drive means mechanically coupled to the injection means for rotating the screw member to provide a quantity of molten material at one end of the screw member;

(c) second drive means mechanically coupled to the injection means for translating the screw member within the tubular barrel, the second drive means including;
   (1) an AC induction motor having a rotor, a stator comprised of a plurality of sets of three phase windings, and means for detecting angular positions of the rotor; and
   (2) vector controller means for controlling the AC induction motor in response to a velocity command signal, the vector controller means being connected to the AC induction motor and including
      (i) a CPU for calculating torque and flux producing components of current passing through the stator windings,
      (ii) current controller means for producing pulse width modulated trigger signals based on the CPU calculations to regulate the current, and
      (iii) power amplifier means for receiving the pulse width modulated trigger signals and applying a controlled current to the stator windings to produce a commutation effect thereby creating a controlled torque and speed for the AC induction motor with periodic torque pulsations;

(d) means connected to the injection means for producing a pressure feedback signal representing a pressure exerted against the screw member by the molten material, the pressure feedback signal changing in response to the torque pulsations; and (e) machine control means connected to the first and second drive means and the means for producing the pressure feedback signal for controlling the machine, the machine control means including
   (1) means for commanding the first drive means to rotate the screw member to provide a quantity of molten material at one end of the screw member,
   (2) means for producing the velocity command signal for commanding the vector controller means to maintain the AC induction motor and screw member at a zero translational velocity,
   (3) means for providing a pressure limit signal representing a desired pressure force between the screw member and the quantity of molten material,
   (4) comparing means responsive to the pressure limit signal and the pressure feedback signal for comparing the signals, and
   (5) means responsive to the comparing means for modifying the velocity command signal thereby reducing changes in the pressure feedback signal caused by the torque pulsations.

12. An injection molding machine for producing a molded part by injecting a molten material into mold elements forming a mold cavity defining the molded part, the machine comprising:

(a) clamp means for supporting and moving the mold elements between open and closed positions;

(b) injection means for injecting the molten material into the mold cavity, said injection means including a screw member rotatably and translatably carried in a tubular barrel having an end in communication with the mold cavity;

(c) first drive means mechanically coupled to the clamp means for imparting relative motion to the mold elements;

(d) second drive means mechanically coupled to the injection means for rotating the screw member;

(e) third drive means mechanically coupled to the injection means for translating the screw member within the tubular barrel;

(f) wherein more than one of the first drive means, the second drive means, and the third drive means further includes
   (1) a motor having a rotor, a stator comprised of a plurality of sets of three phase windings, and means for detecting angular positions of the rotor, and
   (2) electronic controller means for controlling the motor in response to a motor command signal, the electronic controller means being connected to the motor and including
      (i) a CPU for determining the characteristics of current to be applied to the motor,
      (ii) current controller means for producing trigger signals to regulate the current, and
      (iii) power amplifier means for receiving the trigger signals and applying a controlled current to the stator windings to produce a commutation effect thereby creating a controlled torque and speed for the motor;
   (3) the electronic controller having a CPU connected to multiplexing means for switching the trigger signals produced by the current controller means to the power amplifier means for each electronically controlled motor based on an external command input signal; and (g) machine control means connected to the electronic controller means for producing the motor command signal.

* * * * *